J. VENHUIZEN.
CORN HARVESTER.
APPLICATION FILED AUG. 1, 1918.
1,293,583. Patented Feb. 4, 1919.
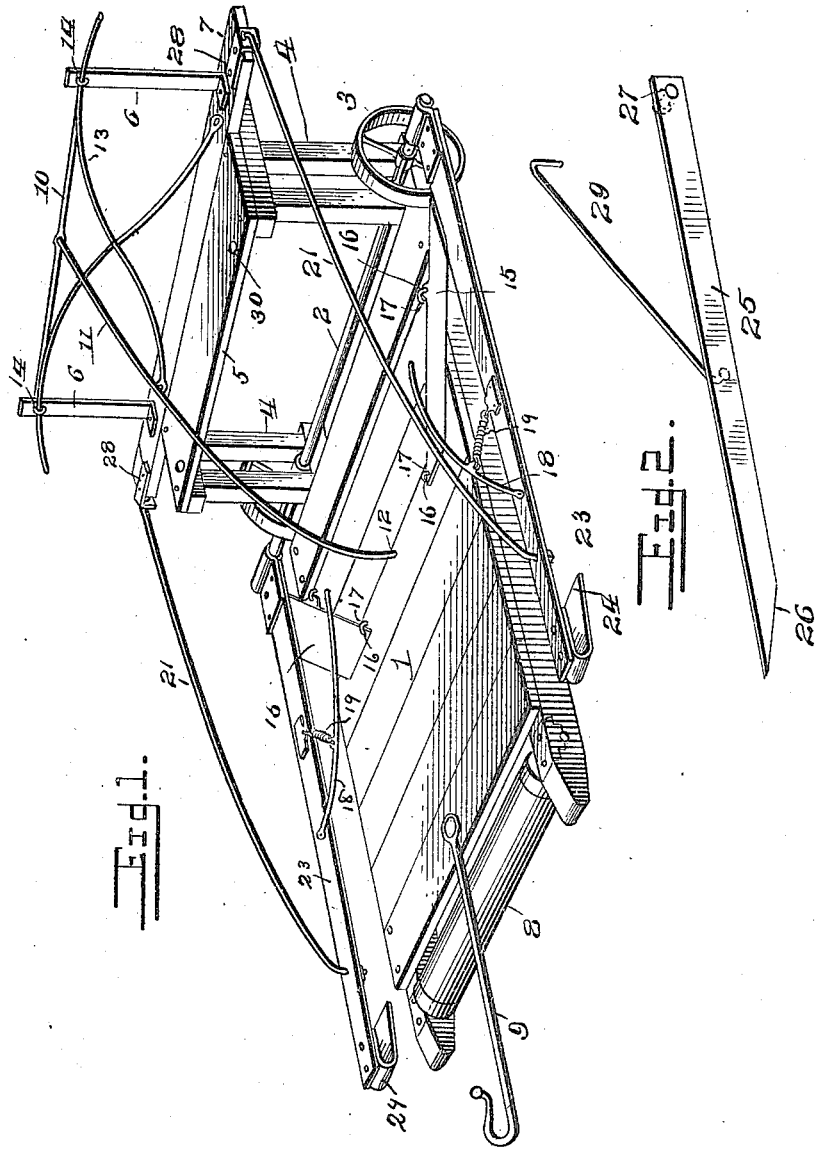

UNITED STATES PATENT OFFICE.

JOHN VENHUIZEN, OF HOLLAND, MICHIGAN.

CORN-HARVESTER.

1,293,583.  Specification of Letters Patent.  Patented Feb. 4, 1919.

Application filed August 1, 1918. Serial No. 247,780.

*To all whom it may concern:*

Be it known that I, JOHN VENHUIZEN, a citizen of the United States, residing at Holland, in the county of Ottawa and State of Michigan, have invented certain new and useful Improvements in Corn-Harvesters; and do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in corn harvesters and comprises a simple and efficient device of this character, having various details of construction, combinations and arrangements of parts which will be hereinafter fully described, shown in the accompanying drawings and then specifically defined in the appended claim.

My invention is illustrated in the accompanying drawings which, with the letters of reference marked thereon, form a part of this application and in which:

Figure 1 is a perspective view of the corn harvester, and

Fig. 2 is a detailed perspective, showing a modified form of an attachment for the apparatus.

Reference now being had to the details of the drawings by numerals:

The frame of the apparatus has a platform 1, the said frame having journaled therein a suitable shaft 2 upon which wheels 3 are mounted. Rising from beams, forming a part of the frame, are the posts 4 supporting a seat 5, and 6 designate standards rising from the cross piece 7 upon the portion of the frame which supports the seat.

Journaled near the forward ends of beams upon which the platform is mounted is a roller 8, and 9 is a draw rod pivotally connected to the platform and to which the power for drawing the apparatus may be connected.

Fastened to the cross rod 10 upon the standard 6 is a rod 11, downwardly curved, and its forward end fastened centrally at 12 to the platform. Rods, designated by numeral 13 are fastened at 14 to the standard 6 and also to the cross piece 7 and intersecting each other, and are provided as a means against which the stalks of corn, after being cut, are leaned.

Cutter knives 15 have apertures 16 engaged by the hooks 17 upon the frame and form means for detachably holding the knives in place, said knives being adapted to be removed without the use of burs.

It will be noted that the knives are disposed at inclinations to the lengths of the platform and offer draw cutting edges to the stalks. Bowed rods 18 are fastened at their forward ends to the lifter members 23 and extend over said knives, and compression coiled springs 19 are fastened to the lifter members and to said bowed rods, the latter being provided for the purpose of supporting and holding the stalks of corn yieldingly while being cut by the knives. The rear end of each lifter member 23 is pivotally mounted upon extended portions of the shaft 2. Rods 21 are fastened at their forward ends to the lifter members and at their rear ends to the ends of the cross piece 7.

Plates 24, bent as shown in the drawings, are fastened to the under surface of the lifter members and adapted to rest upon the ground, said members 24 serving to lift up prostrate stalks of corn before the knives come in contact therewith.

In Fig. 2 of the drawings I have shown an attachment 25, having a beveled edge 26 at its free end and a pin 27 near its rear end, which latter is adapted to engage an aperture in the angled end of the plate 28 fastened to the cross piece 7, while a rod 29 has angled ends, one of which engages an aperture in the member 25 and the other an aperture 30 in the seat. The said member 25 is used in place of the rod 21, when it is desired to utilize the apparatus for lifting corn, most of which is bent over or prostrate.

In operation, the apparatus is driven between the rows of corn, the members 24 lifting up the corn which rests upon the rods 21. As the stalks come in contact with the bowed rod 18, the latter will yield and the stalks will be thrown toward the inclined edges of the cutting knives, causing the stalks to be severed, after which the latter will fall against the rods 11 and 13, and may be bound by hand or otherwise. In the event of it being desired to cut only a single row of stalks at one time, the cutter upon one side or the other may be dispensed with, or two rows may be cut simultaneously.

What I claim to be new is:

A corn harvester, comprising a frame having a platform, a shaft journaled in suitable bearings in said frame, the ends of the shaft projecting beyond the opposite sides of the frame, wheels journaled upon said shaft, a roller journaled in suitable bearings in beams at the forward end of the platform, lifter members journaled at their rear ends upon the projecting ends of said shaft and spaced apart from the opposite sides of the platform, yielding shoes secured to and underneath the forward ends of said members, rods connected at their rear ends to said frame and their other ends to the lifter members, bowed rods fastened at the forward ends to the lifter members and projecting over the platform, springs fastened to said bowed members, a horizontally disposed cross rod supported upon the frame, and a rod connected at one end to said cross rod and its other end to the platform.

In testimony whereof I hereunto affix my signature in presence of two witnesses.

JOHN VENHUIZEN.

Witnesses:
W. J. VENHUIZEN,
JOHN PLAGGEMA.